(12) United States Patent
Bastug et al.

(10) Patent No.: US 11,470,003 B2
(45) Date of Patent: Oct. 11, 2022

(54) FLOW RELIABILITY IN MULTI-TIER DETERMINISTIC NETWORKING

(71) Applicant: Nokia Solutions and Networks Oy, Espoo (FI)

(72) Inventors: Ejder Bastug, Paris (FR); Bilgehan Erman, Weehawken, NJ (US); Bruce Cilli, Atlantic Highlands, NJ (US); Sameerkumar Sharma, Holmdel, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/184,101

(22) Filed: Feb. 24, 2021

(65) Prior Publication Data
US 2022/0272040 A1 Aug. 25, 2022

(51) Int. Cl.
*H04L 47/10* (2022.01)
*H04L 47/70* (2022.01)

(52) U.S. Cl.
CPC ........... *H04L 47/10* (2013.01); *H04L 47/82* (2013.01)

(58) Field of Classification Search
CPC ....... H04L 1/0017; H04L 1/0021; H04L 1/22; H04L 41/0654; H04L 41/0695; H04L 41/0813; H04L 41/0816; H04L 43/0811; H04L 45/123; H04L 45/14; H04L 45/22;
(Continued)

(56) References Cited

U.S. PATENT DOCUMENTS

2002/0059497 A1* 5/2002 Komori .............. H04N 21/2743
  711/111
2011/0299386 A1* 12/2011 Negoto .................. H04L 45/22
  370/221

(Continued)

OTHER PUBLICATIONS

Finn, N., et al., "Deterministic Networking Architecture," IETF, RFC 8655, Oct. 2019, 39 pages.
(Continued)

*Primary Examiner* — Kan Yuen
(74) *Attorney, Agent, or Firm* — Tong, Rea, Bentley & Kim, LLC (57) ABSTRACT

Various example embodiments for supporting flow reliability in deterministic networking are presented. Various example embodiments for supporting flow reliability in deterministic networking may be configured to support flow reliability in deterministic networking based on control over frame replication and elimination for deterministic flows. Various example embodiments for supporting flow reliability in deterministic networking based on control over frame replication and elimination for deterministic flows may be configured to control replication and elimination of redundant flows providing redundancy for deterministic flows based on dynamic activation and deactivation of the redundant flows based on monitoring of flow continuity of the deterministic flows. Various example embodiments for supporting flow reliability in deterministic networking based on control over frame replication and elimination for deterministic flows may be configured to support flow reliability in deterministic networking for non-hierarchical networks or hierarchical networks.

16 Claims, 7 Drawing Sheets

(58) Field of Classification Search
CPC ....... H04L 45/24; H04L 45/38; H04L 47/743; H04L 47/28; H04L 47/29
See application file for complete search history.

(56) References Cited

U.S. PATENT DOCUMENTS

| | | | |
|---|---|---|---|
| 2016/0099866 A1* | 4/2016 | Stellick | H04L 45/22 370/225 |
| 2018/0310202 A1* | 10/2018 | Lohr | H04W 76/27 |
| 2020/0162366 A1* | 5/2020 | Vrzic | H04L 1/0009 |
| 2020/0178331 A1* | 6/2020 | Xu | H04W 76/16 |
| 2021/0021512 A1 | 1/2021 | Erman et al. | |
| 2021/0084539 A1* | 3/2021 | Centonza | H04W 28/085 |
| 2021/0120552 A1* | 4/2021 | Fang | H04L 69/22 |
| 2021/0218817 A1* | 7/2021 | Lou | H04W 76/12 |
| 2021/0345173 A1* | 11/2021 | Uchino | H04W 76/15 |

OTHER PUBLICATIONS

Farkas, J., et al., "Introduction to IEEE 802.1—Focus on the Time-Sensitive Networking Task Group," IEEE Org, May 15, 2017, 50 pages.

IEEE, "P802.1CB—Frame Replication and Elimination for Reliability," IEEE 802.1 Working Group, printed from https://1.ieee802.org/tsn/802-1cb/ on Jan. 20, 2022, 13 pages.

Ali, R., et al., "Hierarchical Deep Double Q-Routing," 2020 IEEE International Conference on Communications (ICC), Oct. 2019, 7 pages.

* cited by examiner

FLOW RELIABILITY IN MULTI-TIER DETERMINISTIC NETWORKING

TECHNICAL FIELD

Various example embodiments relate generally to communication systems and, more particularly but not exclusively, to flow reliability in multi-tier deterministic networking.

BACKGROUND

In various communication networks, various communications technologies may be used to support various types of communications.

SUMMARY

In at least some example embodiments, an apparatus includes at least one processor and at least one memory including a set of instructions, wherein the set of instructions is configured to, when executed by the at least one processor, cause the apparatus to determine, by a node configured to operate as an eliminating node for a redundant flow associated with a deterministic flow, a flow continuity of the deterministic flow and send, by the node configured to operate as the eliminating node for the redundant flow based the flow continuity of the deterministic flow, a message configured to request that the redundant flow be placed in a hold state. In at least some example embodiments, the flow continuity of the deterministic flow is indicative as to whether the deterministic flow has a predictable behavior. In at least some example embodiments, the flow continuity of the deterministic flow is configured to quantify an extent to which a parameter defined for the deterministic flow is satisfied for the deterministic flow. In at least some example embodiments, the parameter defined for the deterministic flow includes at least one of a resource allocation parameter associated with allocation of resources for the deterministic flow in a scheduled time interval of the deterministic flow or a transmission error parameter for packet transmissions on the deterministic flow. In at least some example embodiments, the flow continuity of the deterministic flow is determined based on monitoring of the deterministic flow and the redundant flow. In at least some example embodiments, the flow continuity of the deterministic flow is determined based on learning of a mapping between the deterministic flow and the redundant flow. In at least some example embodiments, the flow continuity for the deterministic flow is determined based on at least one of a machine learning or a probabilistic method. In at least some example embodiments, to send the message configured to request that the redundant flow be placed in the hold state, the set of instructions is configured to, when executed by the at least one processor, cause the apparatus to send the message configured to request that the redundant flow be placed in a hold state based on a determination that the flow continuity of the deterministic flow satisfies a condition. In at least some example embodiments, to send the message configured to request that the redundant flow be placed in the hold state, the set of instructions is configured to, when executed by the at least one processor, cause the apparatus to send the message configured to request that the redundant flow be placed in a hold state based on a determination that the flow continuity of the deterministic flow is predicted to satisfy a condition for a length of time. In at least some example embodiments, the message is configured to request that the redundant flow be placed in the hold state for the length of time. In at least some example embodiments, to send the message configured to request that the redundant flow be placed in the hold state, the set of instructions is configured to, when executed by the at least one processor, cause the apparatus to send, by the node configured to operate as the eliminating node for the redundant flow toward a node configured to operate as a replicating node for the redundant flow, the message configured to request that the redundant flow be placed in the hold state. In at least some example embodiments, the set of instructions is configured to, when executed by the at least one processor, cause the apparatus to send, by node configured to operate as the eliminating node for the redundant flow, a message configured to request that the redundant flow be removed from the hold state.

In at least some example embodiments, a non-transitory computer-readable medium stores a set of instructions configured to cause an apparatus to determine, by a node configured to operate as an eliminating node for a redundant flow associated with a deterministic flow, a flow continuity of the deterministic flow and send, by the node configured to operate as the eliminating node for the redundant flow based the flow continuity of the deterministic flow, a message configured to request that the redundant flow be placed in a hold state. In at least some example embodiments, the flow continuity of the deterministic flow is indicative as to whether the deterministic flow has a predictable behavior. In at least some example embodiments, the flow continuity of the deterministic flow is configured to quantify an extent to which a parameter defined for the deterministic flow is satisfied for the deterministic flow. In at least some example embodiments, the parameter defined for the deterministic flow includes at least one of a resource allocation parameter associated with allocation of resources for the deterministic flow in a scheduled time interval of the deterministic flow or a transmission error parameter for packet transmissions on the deterministic flow. In at least some example embodiments, the flow continuity of the deterministic flow is determined based on monitoring of the deterministic flow and the redundant flow. In at least some example embodiments, the flow continuity of the deterministic flow is determined based on learning of a mapping between the deterministic flow and the redundant flow. In at least some example embodiments, the flow continuity for the deterministic flow is determined based on at least one of a machine learning or a probabilistic method. In at least some example embodiments, to send the message configured to request that the redundant flow be placed in the hold state, the set of instructions is configured to cause the apparatus to send the message configured to request that the redundant flow be placed in a hold state based on a determination that the flow continuity of the deterministic flow satisfies a condition. In at least some example embodiments, to send the message configured to request that the redundant flow be placed in the hold state, the set of instructions is configured to cause the apparatus to send the message configured to request that the redundant flow be placed in a hold state based on a determination that the flow continuity of the deterministic flow is predicted to satisfy a condition for a length of time. In at least some example embodiments, the message is configured to request that the redundant flow be placed in the hold state for the length of time. In at least some example embodiments, to send the message configured to request that the redundant flow be placed in the hold state, the set of instructions is configured to cause the apparatus to send, by the node configured to operate as the eliminating node for the redundant flow toward a node configured to operate as a replicating node for the redundant flow, the message configured to request that the redundant flow be placed in the hold state. In at least some example embodiments, the set of instructions is configured to cause the apparatus to send, by node configured to operate as the eliminating node for the redundant flow, a message configured to request that the redundant flow be removed from the hold state.

In at least some example embodiments, a method includes determining, by a node configured to operate as an eliminating node for a redundant flow associated with a deterministic flow, a flow continuity of the deterministic flow and sending, by the node configured to operate as the eliminating node for the redundant flow based the flow continuity of the deterministic flow, a message configured to request that the redundant flow be placed in a hold state. In at least some example embodiments, the flow continuity of the deterministic flow is indicative as to whether the deterministic flow has a predictable behavior. In at least some example embodiments, the flow continuity of the deterministic flow is configured to quantify an extent to which a parameter defined for the deterministic flow is satisfied for the deterministic flow. In at least some example embodiments, the parameter defined for the deterministic flow includes at least one of a resource allocation parameter associated with allocation of resources for the deterministic flow in a scheduled time interval of the deterministic flow or a transmission error parameter for packet transmissions on the deterministic flow. In at least some example embodiments, the flow continuity of the deterministic flow is determined based on monitoring of the deterministic flow and the redundant flow. In at least some example embodiments, the flow continuity of the deterministic flow is determined based on learning of a mapping between the deterministic flow and the redundant flow. In at least some example embodiments, the flow continuity for the deterministic flow is determined based on at least one of a machine learning or a probabilistic method. In at least some example embodiments, sending the message configured to request that the redundant flow be placed in the hold state includes sending the message configured to request that the redundant flow be placed in a hold state based on a determination that the flow continuity of the deterministic flow satisfies a condition. In at least some example embodiments, sending the message configured to request that the redundant flow be placed in the hold state includes sending the message configured to request that the redundant flow be placed in a hold state based on a determination that the flow continuity of the deterministic flow is predicted to satisfy a condition for a length of time. In at least some example embodiments, the message is configured to request that the redundant flow be placed in the hold state for the length of time. In at least some example embodiments, sending the message configured to request that the redundant flow be placed in the hold state includes sending, by the node configured to operate as the eliminating node for the redundant flow toward a node configured to operate as a replicating node for the redundant flow, the message configured to request that the redundant flow be placed in the hold state. In at least some example embodiments, the method includes sending, by node configured to operate as the eliminating node for the redundant flow, a message configured to request that the redundant flow be removed from the hold state.

In at least some example embodiments, an apparatus includes means for determining, by a node configured to operate as an eliminating node for a redundant flow associated with a deterministic flow, a flow continuity of the deterministic flow and means for sending, by the node configured to operate as the eliminating node for the redundant flow based the flow continuity of the deterministic flow, a message configured to request that the redundant flow be placed in a hold state. In at least some example embodiments, the flow continuity of the deterministic flow is indicative as to whether the deterministic flow has a predictable behavior. In at least some example embodiments, the flow continuity of the deterministic flow is configured to quantify an extent to which a parameter defined for the deterministic flow is satisfied for the deterministic flow. In at least some example embodiments, the parameter defined for the deterministic flow includes at least one of a resource allocation parameter associated with allocation of resources for the deterministic flow in a scheduled time interval of the deterministic flow or a transmission error parameter for packet transmissions on the deterministic flow. In at least some example embodiments, the flow continuity of the deterministic flow is determined based on monitoring of the deterministic flow and the redundant flow. In at least some example embodiments, the flow continuity of the deterministic flow is determined based on learning of a mapping between the deterministic flow and the redundant flow. In at least some example embodiments, the flow continuity for the deterministic flow is determined based on at least one of a machine learning or a probabilistic method. In at least some example embodiments, the means for sending the message configured to request that the redundant flow be placed in the hold state includes means for sending the message configured to request that the redundant flow be placed in a hold state based on a determination that the flow continuity of the deterministic flow satisfies a condition. In at least some example embodiments, the means for sending the message configured to request that the redundant flow be placed in the hold state includes means for sending the message configured to request that the redundant flow be placed in a hold state based on a determination that the flow continuity of the deterministic flow is predicted to satisfy a condition for a length of time. In at least some example embodiments, the message is configured to request that the redundant flow be placed in the hold state for the length of time. In at least some example embodiments, the means for sending the message configured to request that the redundant flow be placed in the hold state includes sending, by the node configured to operate as the eliminating node for the redundant flow toward a node configured to operate as a replicating node for the redundant flow, the message configured to request that the redundant flow be placed in the hold state. In at least some example embodiments, the apparatus includes means for sending, by node configured to operate as the eliminating node for the redundant flow, a message configured to request that the redundant flow be removed from the hold state.

In at least some example embodiments, an apparatus includes at least one processor and at least one memory including a set of instructions, wherein the set of instructions is configured to, when executed by the at least one processor, cause the apparatus to receive, by a node configured to operate as a replicating node for a redundant flow associated with a deterministic flow and from a node configured to operate as an eliminating node for the redundant flow, a message configured to request that the redundant flow be placed in a hold state and place, by the node configured to operate as the replicating node for the redundant flow based on the message, the redundant flow in the hold state. the message is configured to request that the redundant flow be placed in the hold state for a length of time. In at least some example embodiments, the length of time is a length of time for which a flow continuity of the deterministic flow is predicted to satisfy a condition. In at least some example embodiments, to place the redundant flow in the hold state at the node configured to operate as the replicating node for the redundant flow, the set of instructions is configured to, when executed by the at least one processor, cause the apparatus to send, to a time sensitive networking protocol stack on the node configured to operate as the replicating node for the redundant flow, a request to place the redundant flow in the hold state. In at least some example embodiments, the set of instructions is configured to, when executed by the at least one processor, cause the apparatus to remove, by the node configured to operate as the replicating node for the redundant flow based on a determination that a message is not received from the node configured to operate as the eliminating node for the redundant flow for a threshold length of time, the redundant flow from the hold state. In at least some example embodiments, the set of instructions is configured to, when executed by the at least one processor, cause the apparatus to remove, by the node configured to operate as the replicating node for the redundant flow based on an indication of a condition associated with the deterministic flow, the redundant flow from the hold state. In at least some example embodiments, the condition associated with the deterministic flow is a degradation associated with the deterministic flow, an error associated with the deterministic flow, or a failure associated with the deterministic flow. In at least some example embodiments, the set of instructions is configured to, when executed by the at least one processor, cause the apparatus to initiate, by the node configured to operate as the replicating node for the redundant flow, use of at least a portion of the resources of the redundant flow for a different flow. In at least some example embodiments, the different flow supports a different type of traffic than the deterministic flow.

In at least some example embodiments, a non-transitory computer-readable medium stores a set of instructions configured to cause an apparatus to receive, by a node configured to operate as a replicating node for a redundant flow associated with a deterministic flow and from a node configured to operate as an eliminating node for the redundant flow, a message configured to request that the redundant flow be placed in a hold state and place, by the node configured to operate as the replicating node for the redundant flow based on the message, the redundant flow in the hold state. the message is configured to request that the redundant flow be placed in the hold state for a length of time. In at least some example embodiments, the length of time is a length of time for which a flow continuity of the deterministic flow is predicted to satisfy a condition. In at least some example embodiments, to place the redundant flow in the hold state at the node configured to operate as the replicating node for the redundant flow, the set of instructions is configured to cause the apparatus to send, to a time sensitive networking protocol stack on the node configured to operate as the replicating node for the redundant flow, a request to place the redundant flow in the hold state. In at least some example embodiments, the set of instructions is configured to cause the apparatus to remove, by the node configured to operate as the replicating node for the redundant flow based on a determination that a message is not received from the node configured to operate as the eliminating node for the redundant flow for a threshold length of time, the redundant flow from the hold state. In at least some example embodiments, the set of instructions is configured to cause the apparatus to remove, by the node configured to operate as the replicating node for the redundant flow based on an indication of a condition associated with the deterministic flow, the redundant flow from the hold state. In at least some example embodiments, the condition associated with the deterministic flow is a degradation associated with the deterministic flow, an error associated with the deterministic flow, or a failure associated with the deterministic flow. In at least some example embodiments, the set of instructions is configured to cause the apparatus to initiate, by the node configured to operate as the replicating node for the redundant flow, use of at least a portion of the resources of the redundant flow for a different flow. In at least some example embodiments, the different flow supports a different type of traffic than the deterministic flow.

In at least some example embodiments, a method includes receiving, by a node configured to operate as a replicating node for a redundant flow associated with a deterministic flow and from a node configured to operate as an eliminating node for the redundant flow, a message configured to request that the redundant flow be placed in a hold state and placing, by the node configured to operate as the replicating node for the redundant flow based on the message, the redundant flow in the hold state. the message is configured to request that the redundant flow be placed in the hold state for a length of time. In at least some example embodiments, the length of time is a length of time for which a flow continuity of the deterministic flow is predicted to satisfy a condition. In at least some example embodiments, placing the redundant flow in the hold state at the node configured to operate as the replicating node for the redundant flow includes sending, to a time sensitive networking protocol stack on the node configured to operate as the replicating node for the redundant flow, a request to place the redundant flow in the hold state. In at least some example embodiments, the method includes removing, by the node configured to operate as the replicating node for the redundant flow based on a determination that a message is not received from the node configured to operate as the eliminating node for the redundant flow for a threshold length of time, the redundant flow from the hold state. In at least some example embodiments, the method includes removing, by the node configured to operate as the replicating node for the redundant flow based on an indication of a condition associated with the deterministic flow, the redundant flow from the hold state. In at least some example embodiments, the condition associated with the deterministic flow is a degradation associated with the deterministic flow, an error associated with the deterministic flow, or a failure associated with the deterministic flow. In at least some example embodiments, the method includes initiating, by the node configured to operate as the replicating node for the redundant flow, use of at least a portion of the resources of the redundant flow for a different flow. In at least some example embodiments, the different flow supports a different type of traffic than the deterministic flow.

In at least some example embodiments, an apparatus includes means for receiving, by a node configured to operate as a replicating node for a redundant flow associated with a deterministic flow and from a node configured to operate as an eliminating node for the redundant flow, a message configured to request that the redundant flow be placed in a hold state and means for placing, by the node configured to operate as the replicating node for the redundant flow based on the message, the redundant flow in the hold state. the message is configured to request that the redundant flow be placed in the hold state for a length of time. In at least some example embodiments, the length of time is a length of time for which a flow continuity of the deterministic flow is predicted to satisfy a condition. In at least some example embodiments, the means for placing the redundant flow in the hold state at the node configured to operate as the replicating node for the redundant flow includes means for sending, to a time sensitive networking protocol stack on the node configured to operate as the replicating node for the redundant flow, a request to place the redundant flow in the hold state. In at least some example embodiments, the apparatus includes means for removing, by the node configured to operate as the replicating node for the redundant flow based on a determination that a message is not received from the node configured to operate as the eliminating node for the redundant flow for a threshold length of time, the redundant flow from the hold state. In at least some example embodiments, the apparatus includes means for removing, by the node configured to operate as the replicating node for the redundant flow based on an indication of a condition associated with the deterministic flow, the redundant flow from the hold state. In at least some example embodiments, the condition associated with the deterministic flow is a degradation associated with the deterministic flow, an error associated with the deterministic flow, or a failure associated with the deterministic flow. In at least some example embodiments, the apparatus includes means for initiating, by the node configured to operate as the replicating node for the redundant flow, use of at least a portion of the resources of the redundant flow for a different flow. In at least some example embodiments, the different flow supports a different type of traffic than the deterministic flow.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Various example embodiments for supporting flow reliability in deterministic networking are presented. Various example embodiments for supporting flow reliability in deterministic networking may be configured to support flow reliability in deterministic networking based on control over frame replication and elimination for deterministic flows. Various example embodiments for supporting flow reliability in deterministic networking based on control over frame replication and elimination for deterministic flows may be configured to control replication and elimination of redundant flows providing redundancy for deterministic flows based on dynamic activation and deactivation of the redundant flows based on monitoring of flow continuity of the deterministic flows. Various example embodiments for supporting flow reliability in deterministic networking based on control over frame replication and elimination for deterministic flows may be configured to control replication and elimination of redundant flows providing redundancy for deterministic flows in a manner enabling conservation of resources (which may then be used for other purposes, including other types of traffic) such as bandwidth resources, processing resources, resources provided in deterministic protocol stacks for frame replication and elimination, or the like, as well as various combinations thereof. Various example embodiments for supporting flow reliability in deterministic networking may be configured to support flow reliability for deterministic networking which may be based on various deterministic networking capabilities (e.g., Institute of Electrical and Electronics Engineers (IEEE) Time-Sensitive Networking (TSN), Internet Engineering Task Force (IETF) Deterministic Networking (DetNet), or the like). Various example embodiments for supporting flow reliability in deterministic networking may be configured to support flow reliability for deterministic networking in multi-tiered deterministic networks. Various example embodiments for supporting flow reliability in deterministic networking may be configured to support flow reliability in deterministic networking that is configured to ensure bounded performance for various metrics (e.g., delay, jitter, reliability, or the like, as well as various combinations thereof). Various example embodiments for supporting flow reliability in deterministic networking may be configured to support flow reliability in deterministic networking that may be based on various network topologies (e.g., single-tiered deterministic networks, multi-tiered deterministic networks, or the like). Various example embodiments for supporting flow reliability in deterministic networking may be configured to support flow reliability in deterministic networking that may be applied in various networks (e.g., networks based on various types of networking technologies, non-hierarchical networks or hierarchical networks, or the like, as well as various combinations thereof). Various example embodiments for supporting flow reliability in deterministic networking may be configured to support flow reliability in deterministic networking that may be applied in various contexts for ensuring bounded performance for various metrics (e.g., supporting autonomous vehicles, factory automation, communication at mining sites, or the like). It will be appreciated that these as well as various other example embodiments and advantages or potential advantages may be further understood by first considering a generic description of a communication network in which deterministic networking may be applied, as well as a specific example of such a communication network in which deterministic networking has been applied as presented in FIG. 1.

The communication network, which may be either physical or virtual, includes N communication nodes connected via unidirectional communication links. The representation of this network may be given by a directed graph $\mathcal{G} = (v, \varepsilon)$, where v includes the set of nodes and E includes available links between the nodes. The network is managed in a regional area with a single administration with the goal of providing non-deterministic communication services and deterministic communication services to various customers (e.g., industrial customers, end-users applications, and so forth). The nodes in the network are capable of routing their own packets or intermediate packets using various routing techniques (e.g., segment routing, source routing, or the like, as well as various combinations thereof) over protocol stacks which may support various types of protocols (e.g., Internet Protocol (IP), Multiprotocol Label Switching (MPLS), or the like, as well as various combinations thereof). The protocol stacks also may support deterministic communication guarantees for various parameters (e.g., latency, jitter, reliability, or the like, as well as various combinations thereof) based on various technologies configured to support such deterministic communication guarantees (e.g., IEEE TSN, IETF DetNet, communication stacks that are capable of supporting deterministic communication guarantees, or the like, as well as various combinations thereof).

The communication network may be hierarchical. The communication network may be formed into K tiers where each tier k has $C_k$ number of clusters under its coverage. The clusters may be defined statically by network designer or automatically according to an algorithmic mechanism (e.g., based on predefined intents/criteria which are the basis for cluster formation). In the lowest tier (k=K), each cluster consists of nodes with one of the nodes in the cluster being a designated cluster leader in charge of handling various tasks on behalf of nodes within the cluster (e.g., control plane procedures, bootstrap procedures, or the like, as well as various combinations thereof). The control procedures of a cluster leader are handled by its associated network controller, which is connected to the cluster leader and which is potentially hierarchically connected to a high-tier network controller or a top network controller. It will be appreciated that networks may be arranged into multi-tier hierarchical networks using any suitable number of tiers, clusters, nodes per cluster, and so forth. It will be appreciated that such a multi-tiered hierarchical network, including clusters and cluster leaders as well as associated network controllers, may be configured statically or may be configured dynamically (e.g., using statistical tools, machine learning tools, or the like, as well as various combinations thereof).

Figure 1:
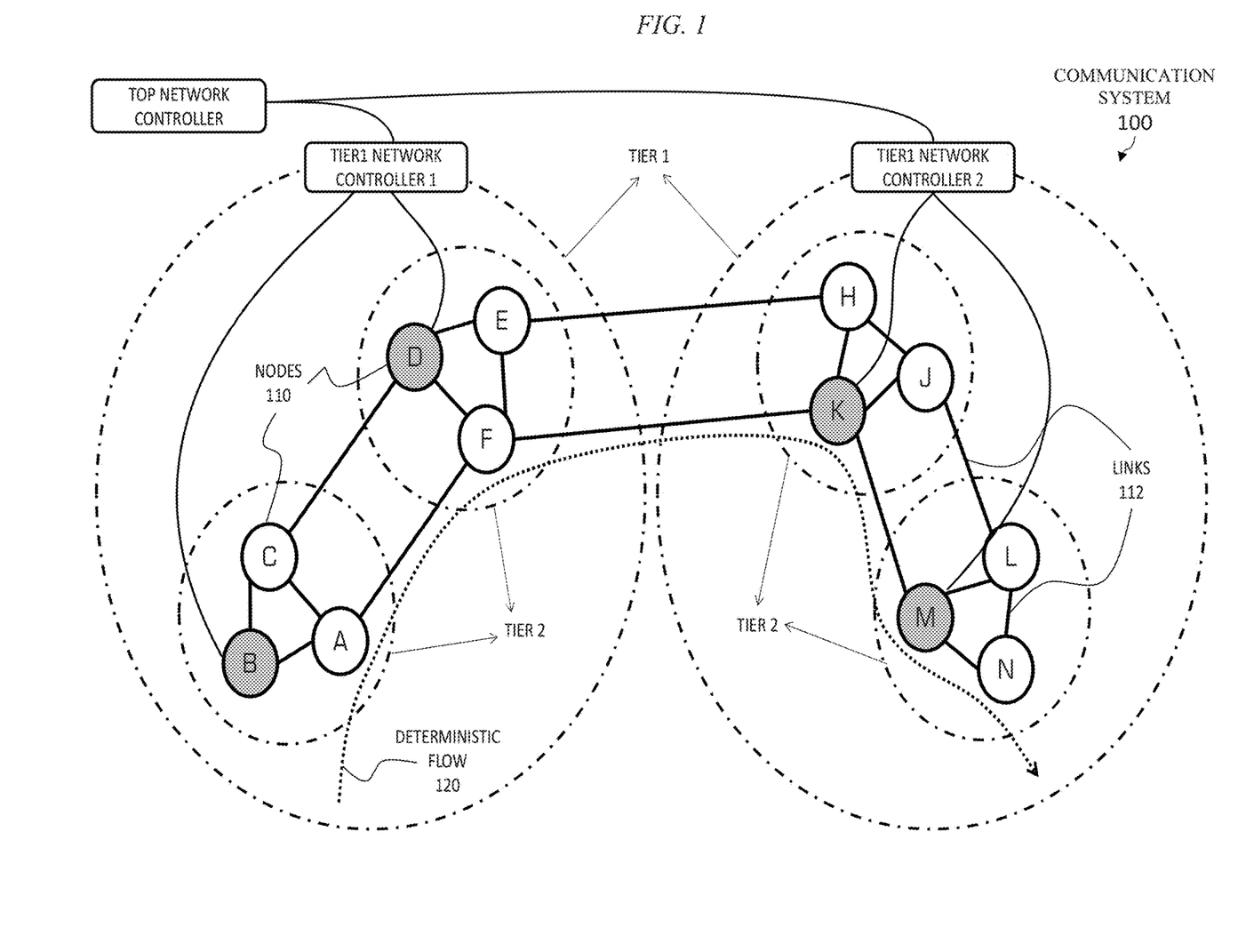
FIG. 1 depicts an example embodiment of a communication system configured to support deterministic networking.

It is noted that an example of such a multi-tiered hierarchical network that is configured to support deterministic networking is presented in FIG. 1.

FIG. 1 depicts an example embodiment of a communication system configured to support deterministic networking.

In FIG. 1, the communication system 100 includes a set of nodes 110 interconnected by a set of links 112. The nodes 110 are labeled as nodes A, B, C, D, E, F, H, J, K, L, M, and N for ease of reference. The nodes 110, as illustrated in FIG. 1, have been organized into clusters in two tiers (K=2) to form a multi-tier hierarchical deterministic network. The lower tier, denoted as Tier 2, includes four clusters as follows: (1) a first cluster including nodes A, B, and C with node B operating as the cluster leader, (2) a second cluster including nodes D, E, and F with node D operating as the cluster leader, (3) a third cluster including nodes H, J, and K with node K operating as the cluster leader, and (4) a fourth cluster including nodes L, M, and N with node M operating as the cluster leader. The upper tier, denoted as Tier 1, includes two clusters, each of which includes two of the Tier 2 clusters as sub-clusters as follows: (1) the first Tier 1 cluster includes the [A, B, C] and [D, E, F] clusters as sub-clusters and has a network controller (denoted as Tier1 Network Controller 1) as its leader and (2) the second Tier 1 cluster includes the [H, J, K] and [L, M, N] clusters as sub-clusters and has a network controller (denoted as Tier1 Network Controller 2) as its leader. The Tier1 Network Controllers are controlled by a Top Network Controller, such that the Top Network Controller is capable of controlling any of the nodes 110 in the communication system 100. It will be appreciated that, although primarily presented with respect to a multi-tier hierarchical deterministic network having a specific number of hierarchical levels, the multi-tier hierarchical deterministic network may have any suitable number of hierarchical levels.

In FIG. 1, the communication system 100 supports deterministic networking. The deterministic networking may be based on one or more deterministic networking standards, such as IEEE TSN, IETF DetNet, or the like. The deterministic networking may be configured to provide deterministic services of bounded latency and zero congestion loss by configuring and allocating network resources for exclusive use of deterministic flows, providing or finding (in the data plane) the resources to be exploited by any given packet, and characterizing the behavior of those resources (e.g., transmission queue selection) so that latency and reliability bounds can be assured. The deterministic networking standards may include various types of standards, such as time synchronization standards (e.g., IEEE 802.1AS, IEEE 1588, or the like), high reliability (e.g., IEEE P802.1cb, IEEE 802.1Qca, IEEE 802.1Qci, P802.1AS-Rev, or the like), bounded latency (e.g., IEEE 802.1Qav, IEEE 802.1Qbu, IEEE 802.1Qbv, IEEE 802.1Qch, IEEE 802.1Qcr, or the like), data resources and APIs (e.g., IEEE 802.1Qat, IEEE 802.1Qcc, IEEE 802.1Qcp, IEEE 802.1CS, or the like), or the like, as well as various combinations thereof. It is noted that various example embodiments presented herein may be configured to extend IEEE 802.1cb to provide improved frame replication and elimination for deterministic networking reliability. In FIG. 1, an example of a deterministic flow 120, going through the path of A↔F↔K↔M↔N, also is illustrated. The communication system 100 also may support deterministic networking reliability and it is assumed that flow replication and elimination may occur at any node 110 of the communication system 100. An example of deterministic networking reliability based on flow replication and elimination is presented in FIG. 2.

Figure 2:
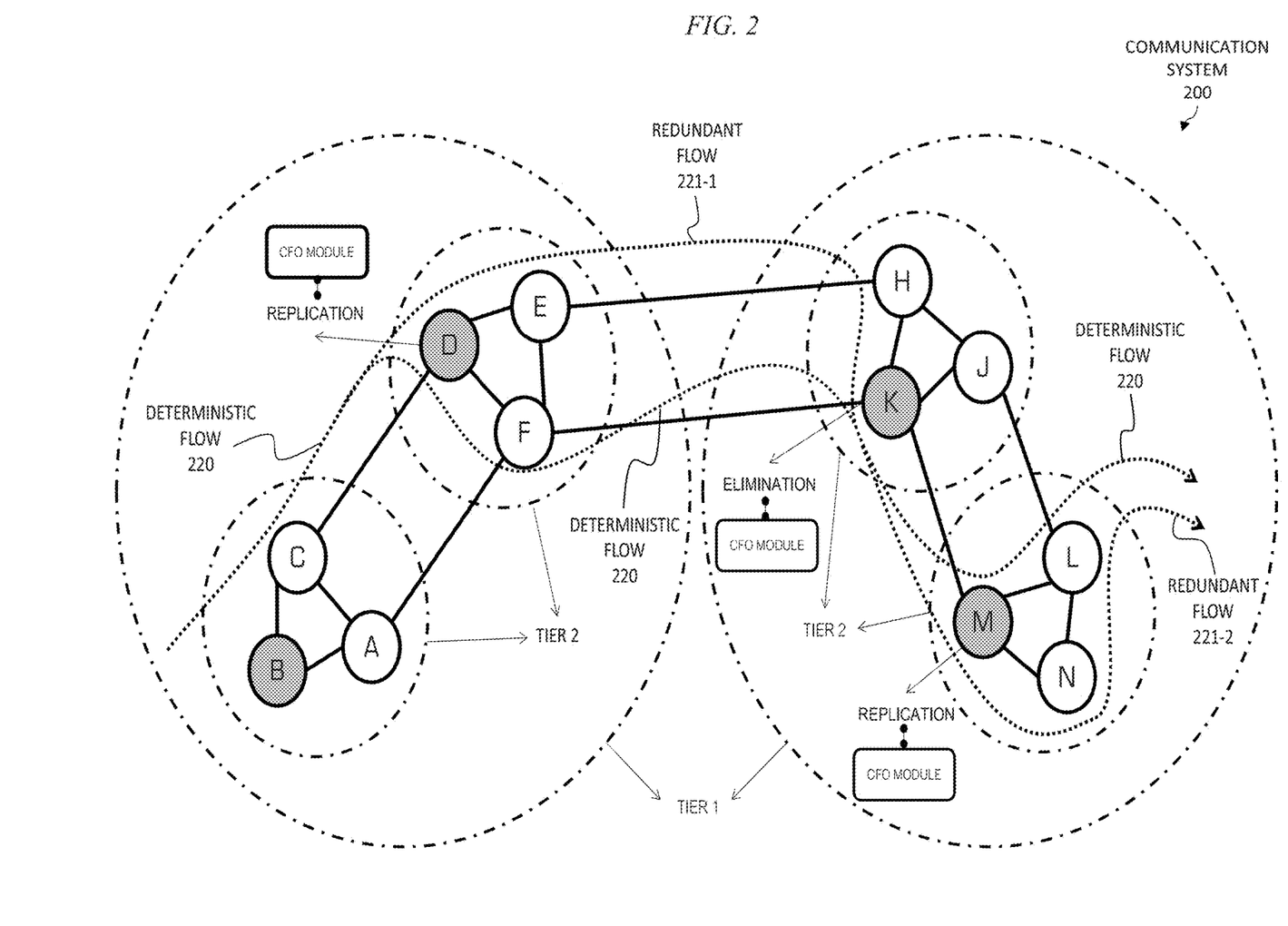
FIG. 2 depicts an example embodiment of a communication system configured to support deterministic networking reliability based on flow replication and elimination.

FIG. 2 depicts an example embodiment of a communication system configured to support deterministic networking reliability based on flow replication and elimination.

In FIG. 2, the communication system 200 supports reliability for deterministic networking. The reliability for deterministic networking may be based on use of redundant flows to protect deterministic flows. The reliability for a deterministic flow based on use of a redundant flow to protect at least a portion of the deterministic flow may be based on use of deterministic flow replication/elimination capabilities along the path of the deterministic flow. The reliability for a deterministic flow based on use of deterministic flow replication/elimination capabilities along the path of the deterministic flow may be based on use of a replication function configured to replicate the deterministic flow to provide the redundant flow for the deterministic flow and an elimination function configured to eliminate the redundant flow for the deterministic flow. It will be appreciated that one or more such pairs of replication and elimination functions may be used along a deterministic flow to provide reliability for one or more portions of the deterministic flow. It will be appreciated that, by replicating flows, sending flows on separate paths, and then using sequence numbers to eliminate replicas, the effective probability of packet loss is reduced or minimized and reliability of the deterministic flows is increased or maximized. The reliability for deterministic networking may be based on IEEE P802.1CB Frame Replication and Elimination for Reliability (FRER) or other suitable standards.

In FIG. 2, the communication system 200 includes a similar arrangement of nodes as in the communication system 100 of FIG. 1, including the clustering of the nodes as well as the hierarchical arrangement of the nodes. The communication system 200 includes a deterministic flow 220 along the path C↔D↔F↔K↔M↔L. The communication system 200 includes two redundant flows 221-1 and 221-2 (collectively, redundant flows 221) configured to protect portions of the deterministic flow 220. Namely, the redundant flow 221-1 follows the path D↔E↔H↔K that protects the portion of the deterministic flow 220 between nodes D and K (based on a replication function performed at node D and an elimination function performed at node K) and the redundant flow 221-2 follows the path M↔N↔L that protects the portion of the deterministic flow 220 between nodes M and L (based on a replication function performed at node M and an elimination function which is located downstream and which, for purposes of clarity, is omitted from FIG. 2).

In FIG. 2, the communication system 200 is configured to support reliable deterministic networking in a manner enabling conservation of resources. The reliability deterministic networking may be provided in a manner enabling conservation of resources by dynamically activating and deactivating redundant flows 221 protecting the deterministic flow 220 (e.g., either or both of redundant flow 221-1 and redundant flow 221-2 protecting deterministic flow 220). The redundant flows 221 may be deactivated during periods of time in which the continuity of the deterministic flow 220 is predicted to be relatively good (e.g., satisfying a particular threshold with a particular accuracy for a particular length of time) and activated during periods of time in which the continuity of the deterministic flow 220 is predicted to be relatively bad (e.g., failing to satisfy a particular threshold with a particular accuracy for a particular length of time). The redundant flows 221 also may be activated in response to other conditions (e.g., failure to receive an indication that the redundant flow 221 is to remain deactivated, detection of a condition (e.g., degradation, error, failure, or the like) associated with the deterministic flow 220, or the like, as well as various combinations thereof). The redundant flows 221 may be dynamically deactivated and reactivated by placing the redundant flows 221 in a hold state on the nodes performing replication and removing the redundant flows from the hold state on the nodes performing replication, respectively.

In FIG. 2, the support for reliable deterministic networking based on dynamic activation and deactivation of the redundant flows 221 for the deterministic flow 220 may be performed based on interaction between the nodes performing replication of the deterministic flow 220 to provide the redundant flows 221 and the nodes performing elimination of the redundant flows 221 associated with the deterministic flow.

The node that is performing elimination for a redundant flow 221 associated with the deterministic flow 220 may control dynamic deactivation of the redundant flows 221 based on monitoring of the deterministic flow 220 and the redundant flow 221. The node that is performing elimination for a redundant flow 221 associated with the deterministic flow 220 may control dynamic deactivation of the redundant flow 221 by determining a flow continuity of the deterministic flow 220 and triggering placement of the redundant flow 221 in a hold state based on the flow continuity of the deterministic flow 220. The node that is performing elimination for a redundant flow 221 associated with the deterministic flow 220 may control dynamic deactivation of the redundant flow 221 by determining a flow continuity of the deterministic flow 220 and triggering placement of the redundant flow 221 in a hold state based on a determination that the flow continuity of the deterministic flow 220 satisfies a condition. The flow continuity of the deterministic flow may be indicative as to whether the deterministic flow has a predictable behavior. The flow continuity of the deterministic flow may be configured to quantify an extent to which a parameter defined for the deterministic flow is satisfied for the deterministic flow (e.g., a resource allocation parameter associated with allocation of resources for the deterministic flow in a scheduled time interval of the deterministic flow, a transmission error parameter for packet transmissions on the deterministic flow, or the like, as well as various combinations thereof). It is noted that the flow continuity of the deterministic flow 220, which may be a measure of the flow continuity (and, thus, which also may be referred to as a measure of the flow continuity of the deterministic flow 220), may be determined in various ways and evaluated in various ways for controlling dynamic deactivation of the redundant flow 221 associated with the deterministic flow.

The flow continuity of the deterministic flow 220 may be determined in various ways. The flow continuity of the deterministic flow 220 may be determined by computing the flow continuity, estimating the flow continuity, predicting the flow continuity, or the like, as well as various combinations thereof. The flow continuity of the deterministic flow 220 may be determined based on monitoring of the deterministic flow 220 and the redundant flow 221. The flow continuity of the deterministic flow 220 may be determined based on learning of a mapping between the deterministic flow 220 and the redundant flow 221 (e.g., based on continuous learning of mappings between the deterministic flow 220 and the redundant flow 221). The flow continuity of the deterministic flow 220 may be determined based on a machine learning model, a probabilistic method, or the like, as well as various combinations thereof. For example, the flow continuity of the deterministic flow 220 may be determined using an estimation in which a moving window is divided into two time intervals, where the first and second halves of the window keep track of statistics separately (e.g., counting packet drops/errors, average number of packets, average duration between packets, Fourier analysis, or the like, as well as various combinations thereof), and a loss of flow continuity may be identified based on a determination that the statistics of the two intervals in the moving window are not correlated (e.g., not correlated within a threshold). The flow continuity of the deterministic flow 220 may be determined in various other ways.

The determination that the flow continuity of the deterministic flow 220 satisfies the condition may be performed in various ways (which may be based on various types of conditions). The condition that is used for evaluating the flow continuity of the deterministic flow may be that the flow continuity of the deterministic flow 220 satisfies a threshold. The condition that is used for evaluating the flow continuity of the deterministic flow may be that the flow continuity of the deterministic flow 220 satisfies a threshold for a given length of time. The condition that is used for evaluating the flow continuity of the deterministic flow may be that the flow continuity of the deterministic flow 220 is predicted to satisfy a threshold for a given length of time into the future. The determination that the flow continuity of the deterministic flow satisfies a condition may include a determination that the flow continuity of the deterministic flow 220 is stable (e.g., a determination that the flow continuity is above a flow continuity threshold or satisfies a flow continuity condition indicative that the flow continuity is stable, a determination that at least one parameter indicative of the flow continuity satisfies a threshold, or the like), a determination that the flow continuity of the deterministic flow 220 has been stable for a length of time (e.g., a determination that the flow continuity has been above a flow continuity threshold for a length of time or has satisfied a flow continuity condition indicative that the flow continuity is stable for a length of time, a determination that at least one parameter indicative of the flow continuity satisfied a threshold for a length of time, or the like), a determination that the flow continuity of the deterministic flow 220 is predicted to be stable for a length of time in the future (e.g., a determination that the flow continuity is predicted to remain above a flow continuity threshold for a length of time into the future or is predicted to satisfy a flow continuity condition indicative that the flow continuity is stable for a length of time for a length of time into the future, a determination that at least one parameter indicative of the flow continuity is predicted to satisfy a threshold for a length of time into the future, or the like), or the like, as well as various combinations thereof. The determination that the flow continuity of the deterministic flow 220 satisfies the condition may be performed in various other ways (which may be based on various types of conditions).

The dynamic deactivation of the redundant flow 221 based on the flow continuity of the deterministic flow 220 may be performed based on messaging between the node that is performing elimination for a redundant flow 221 associated with the deterministic flow 220 and the node that is performing replication of the deterministic flow 220 to provide the redundant flow 221.

The node that is performing elimination for a redundant flow 221 may trigger placement of the redundant flow 221 in a hold state, based on the flow continuity of the deterministic flow 220, by sending a message to the node that is performing replication of the deterministic flow 220 such that the node that is performing replication of the deterministic flow 220 temporarily stops performing replication of the deterministic flow 220 to provide the redundant flow 221.

The node that is performing replication of the deterministic flow 220 to provide the redundant flow 221, in response to a message from the eliminating node for the redundant flow 221 that indicates that the redundant flow 221 is to be placed in the hold state, places the redundant flow 221 in a hold state so that the node that is performing replication of the deterministic flow 220 to provide the redundant flow 221 temporarily stops performing replication of the deterministic flow 220 to provide the redundant flow 221.

The node that is performing replication of the deterministic flow 220 to provide the redundant flow 221, while the redundant flow 221 is in the hold state, may then use part of all of the resources previously being used by the redundant flow 221 for other purposes (e.g., supporting one or more other flows, including flow which may be deterministic or flow that may be non-deterministic).

The node that is performing replication of the deterministic flow 220 to provide the redundant flow 221 may keep the redundant flow 221 in the hold state until determining that the redundant flow 221 is to be removed from the hold state. The node that is performing replication of the deterministic flow 220 to provide the redundant flow 221 may determine that the redundant flow 221 is to be removed from the hold state based on a message from the node that is performing elimination for a redundant flow 221 (e.g., based on a determination by the node that is performing elimination for a redundant flow 221 that the time period initially specified for the hold is over, based on detection of a condition by the node that is performing elimination for a redundant flow 221, or the like). The node that is performing replication of the deterministic flow 220 to provide the redundant flow 221 may determine that the redundant flow is to be removed from the hold state based on detection of a condition by the node that is performing replication of the deterministic flow 220 to provide the redundant flow 221 (e.g., based on a determination that additional hold signaling is not received from the node that is performing elimination for a redundant flow 221, based on detection of a condition associated with the deterministic flow 220 (e.g., degradation, error, failure, or the like), or the like).

It is noted that, as illustrated in FIG. 2, such functions for dynamically controlling activation and deactivation of redundant flows 221 for the deterministic flow 220 may be performed by cognitive flow optimizers (CFO) associated with the nodes.

Figure 3:
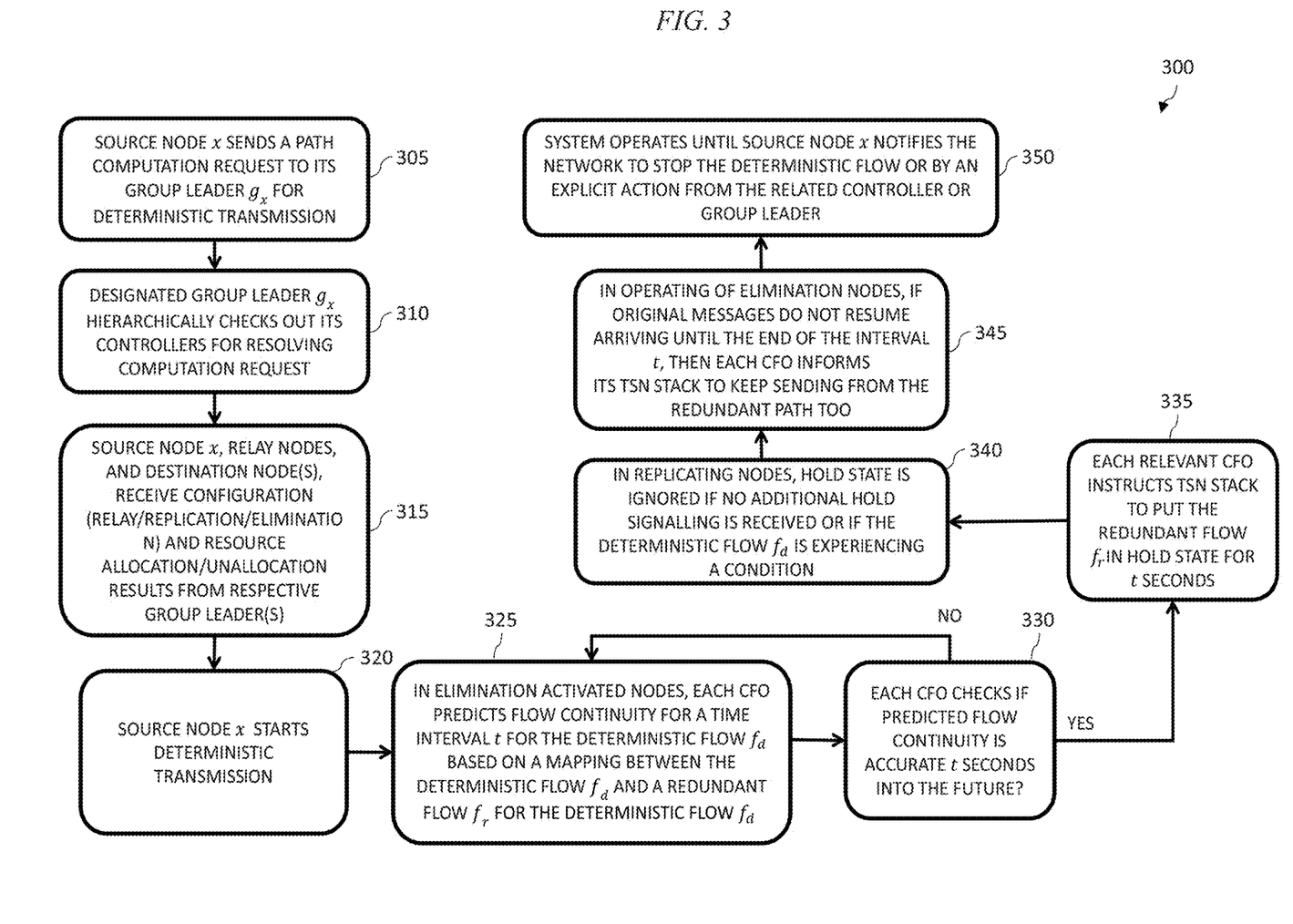
FIG. 3 depicts an example embodiment of a method for deterministic flow allocation and management for a deterministic flow.

It is noted that an example embodiment of a method for use in controlling flow replication and elimination for a deterministic flow is presented in FIG. 3.

It is noted that such support for reliable deterministic networking enables conservation of various types of resources (which may then be used for other purposes) such as bandwidth resources, processing resources, resources provided in deterministic protocol stacks for frame replication and elimination, or the like, as well as various combinations thereof.

It will be appreciated, that although primarily presented with respect to supporting reliability for deterministic networking in a particular type of communication network (e.g., a network having specific types, numbers, and arrangements of nodes organized in a multi-tier hierarchical manner), reliability for deterministic networking may be supported in various other types of communication networks (e.g., networks having other types, numbers, and/or arrangements of nodes, networks that are not hierarchical or that are hierarchical with other numbers of hierarchical levels, or the like, as well as various combinations thereof).

FIG. 3 depicts an example embodiment of a method for deterministic flow allocation and management for a deterministic flow. It will be appreciated that, although presented as being performed serially, at least a portion of the functions of method 300 of FIG. 3 may be performed contemporaneously or in a different order than as presented in FIG. 3. It will be appreciated that various portions of method 300 of FIG. 3 may be performed by various elements of the network (e.g., controllers, nodes including source, transit, and destination nodes, elements of nodes such as CFOs, or the like, as well as various combinations thereof).

At block 305, the source node x sends a path computation request to its designated group leader $g_x$ for ultra-reliable deterministic transmission between two nodes.

At block 310, the designated group leader $g_x$ hierarchically checks out its controllers for resolving the path computation request. The main path for the requested flow between two nodes, and replicated and eliminated sub-paths, are determined.

At block 315, the nodes of the path for the deterministic flow—including the source node x, the relay nodes, and the destination node(s)—receive configuration (relay/replication/elimination) and resource allocation/deallocation results from their respective group leader(s). The nodes along the path of the deterministic flow, depending on the configuration, allocate deterministic resources for the deterministic flow (e.g., by triggering deterministic flow protocol stacks, such as IEEE TSN, IETF DetNet, or the like).

At block 320, the source node x starts its ultra-reliable deterministic transmission. The flow keeps being transmitted in a deterministic way, in compliance with the deterministic flow protocol stacks (e.g. IEEE TSN, IETF DetNet, or the like).

At block 325, in eliminating nodes, the CFO monitors the flow continuity of the deterministic flow $f_d$ for determining whether the flow continuity of the deterministic flow $f_d$ is predicted to be accurate for t time into the future (e.g., the flow continuity is predicted to satisfy a threshold for flow continuity, such that the deterministic flow $f_d$ may be considered to be stable with stable flow continuity, for t time into the future). The CFO may monitor the flow continuity of the deterministic flow $f_d$ by continuously learning the mapping between a deterministic flow $f_d$ and its redundant flow $f_r$ (which also may be referred to as a replicated flow). The CFO may continuously learn the mapping between the deterministic flow $f_d$ and its redundant flow $f_r$ by using a machine learning method or a probabilistic method for continuous estimation.

At block 330, in the eliminating nodes, each CFO checks whether the flow continuity of the deterministic flow $f_d$ is predicted or estimated to be accurate for t time into the future. If the flow continuity of the deterministic flow $f_d$ is predicted to be accurate for t time into the future, then the method 300 proceeds to block 335, otherwise the method 300 returns to block 325 to continue monitoring the continuity of the deterministic flow $f_d$.

At block 335, each relevant CFO instructs the deterministic flow protocol stack to put the redundant flow $f_r$ in a HOLD state for t seconds. The CFO units in charge of replicating and eliminating communicate with each other, and the CFO unit in the eliminating node signals the CFO in the replicating node with an indication that the redundant flow $f_r$ is to be put in a HOLD state for t seconds. The CFO unit in the replicating node, upon receiving an indication from the CFO of the eliminating node that the redundant flow $f_r$ is to be put in a HOLD state for t seconds, puts the redundant flow $f_r$ in the HOLD state for t seconds at the replicating node such that the redundant flow $f_r$ is no longer created and sent by the replicating node. The CFO unit in the replicating node may put the redundant flow $f_r$ in the HOLD state for t seconds at the replicating node by signaling a deterministic networking protocol stack (e.g., IEEE TSN, IETF DetNet, or the like) at the replicating node with the indication that the redundant flow $f_r$ is to be put in a HOLD state for t seconds.

At block 340, in replicating nodes, the HOLD state on the redundant flow $f_r$ is maintained until a condition is detected. The CFO in the replicating node may ignore or remove the HOLD state from the redundant flow $f_r$ (and, thus, begin sending the redundant flow $f_r$ in addition to the deterministic flow $f_d$ again) based on detection of a condition. The CFO in the replicating node may ignore or remove the HOLD state from the redundant flow $f_r$ based on a determination that additional signaling is not received from the CFO of the eliminating node (e.g., if the CFO of the replicating node does not receive additional signaling from the CFO of the eliminating node indicating that the redundant flow $f_r$ is to remain in the HOLD state). The CFO in the replicating node may ignore or remove the HOLD state from the redundant flow $f_r$ based on a determination that the deterministic flow $f_d$ has a condition (e.g., degradation, error, failure, or the like) associated therewith such that the redundant flow $f_r$ should again be sent to provide redundancy for the deterministic flow $f_d$.

At block 345, in operating of elimination nodes, if original messages do not resume arriving until the end of the interval t, then each CFO instructs the deterministic flow protocol stack to keep sending from the redundant path too.

At block 350, the nodes of the path continue to operate until the source node x notifies the network to stop the deterministic flow $f_d$ or by an explicit action from the related controller.

Figure 4:
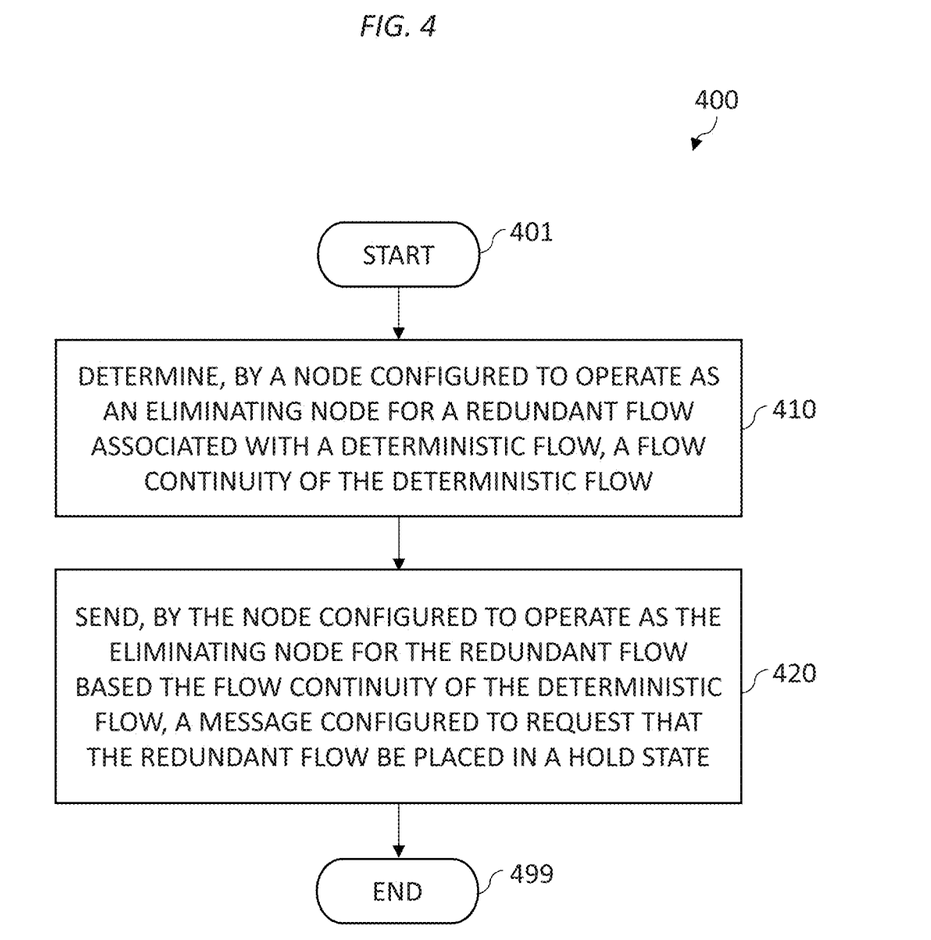
FIG. 4 depicts an example embodiment of a method for use by a node operating as an eliminating node for a deterministic flow having an associated redundant flow for reliability to support control over the redundant flow for resource conservation.

FIG. 4 depicts an example embodiment of a method for use by a node operating as an eliminating node for a deterministic flow having an associated redundant flow for reliability to support control over the redundant flow for resource conservation. It will be appreciated that although primarily presented as being performed serially, at least a portion of the blocks of method 400 may be performed contemporaneously or in a different order than as presented in FIG. 4. At block 401, the method 400 begins. At block 410, determine, by a node configured to operate as an eliminating node for a redundant flow associated with a deterministic flow, a flow continuity of the deterministic flow. At block 420, send, by the node configured to operate as the eliminating node for the redundant flow based the flow continuity of the deterministic flow, a message configured to request that the redundant flow be placed in a hold state. At block 499, the method 400 ends.

Figure 5:
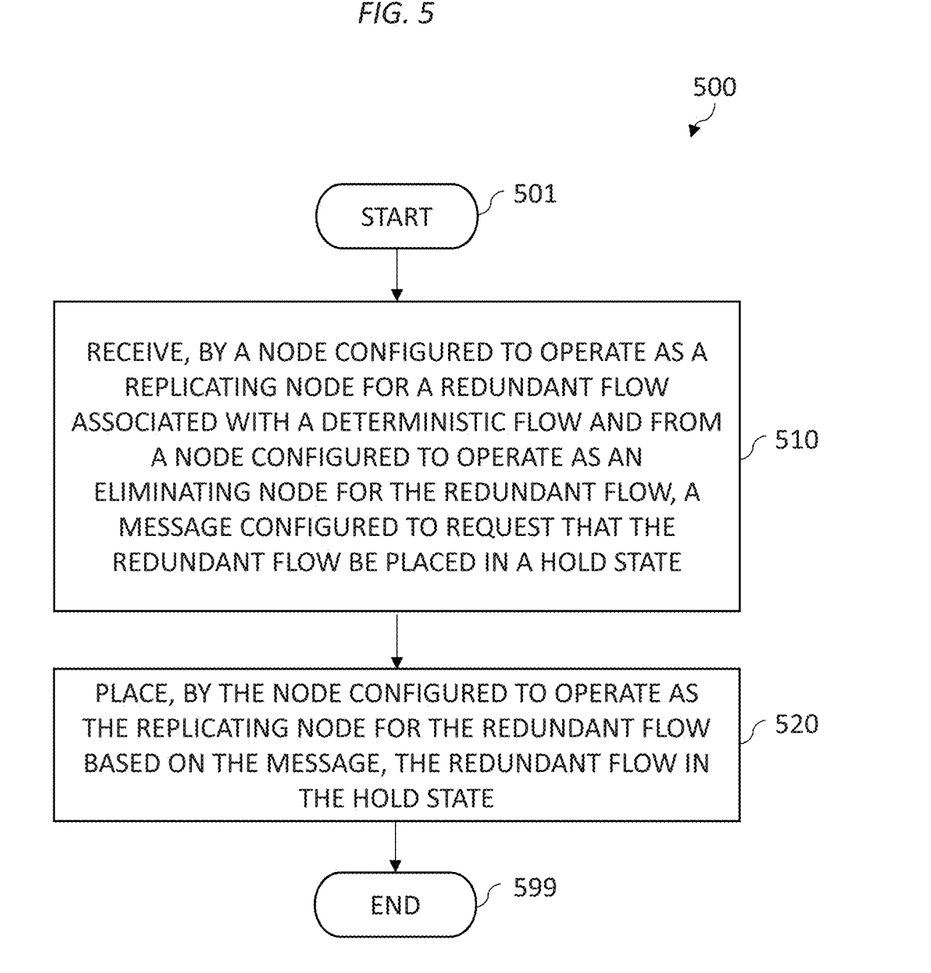
FIG. 5 depicts an example embodiment of a method for use by a node operating as a replicating node for a deterministic flow having an associated redundant flow for reliability to support control over the redundant flow for resource conservation.

FIG. 5 depicts an example embodiment of a method for use by a node operating as a replicating node for a deterministic flow having an associated redundant flow for reliability to support control over the redundant flow for resource conservation. It will be appreciated that although primarily presented as being performed serially, at least a portion of the blocks of method 500 may be performed contemporaneously or in a different order than as presented in FIG. 5. At block 501, the method 500 begins. At block 510, receive, by a node configured to operate as a replicating node for a redundant flow associated with a deterministic flow and from a node configured to operate as an eliminating node for the redundant flow, a message configured to request that the redundant flow be placed in a hold state. At block 520, place, by the node configured to operate as the replicating node for the redundant flow based on the message, the redundant flow in the hold state. At block 599, the method 500 ends.

Figure 6:
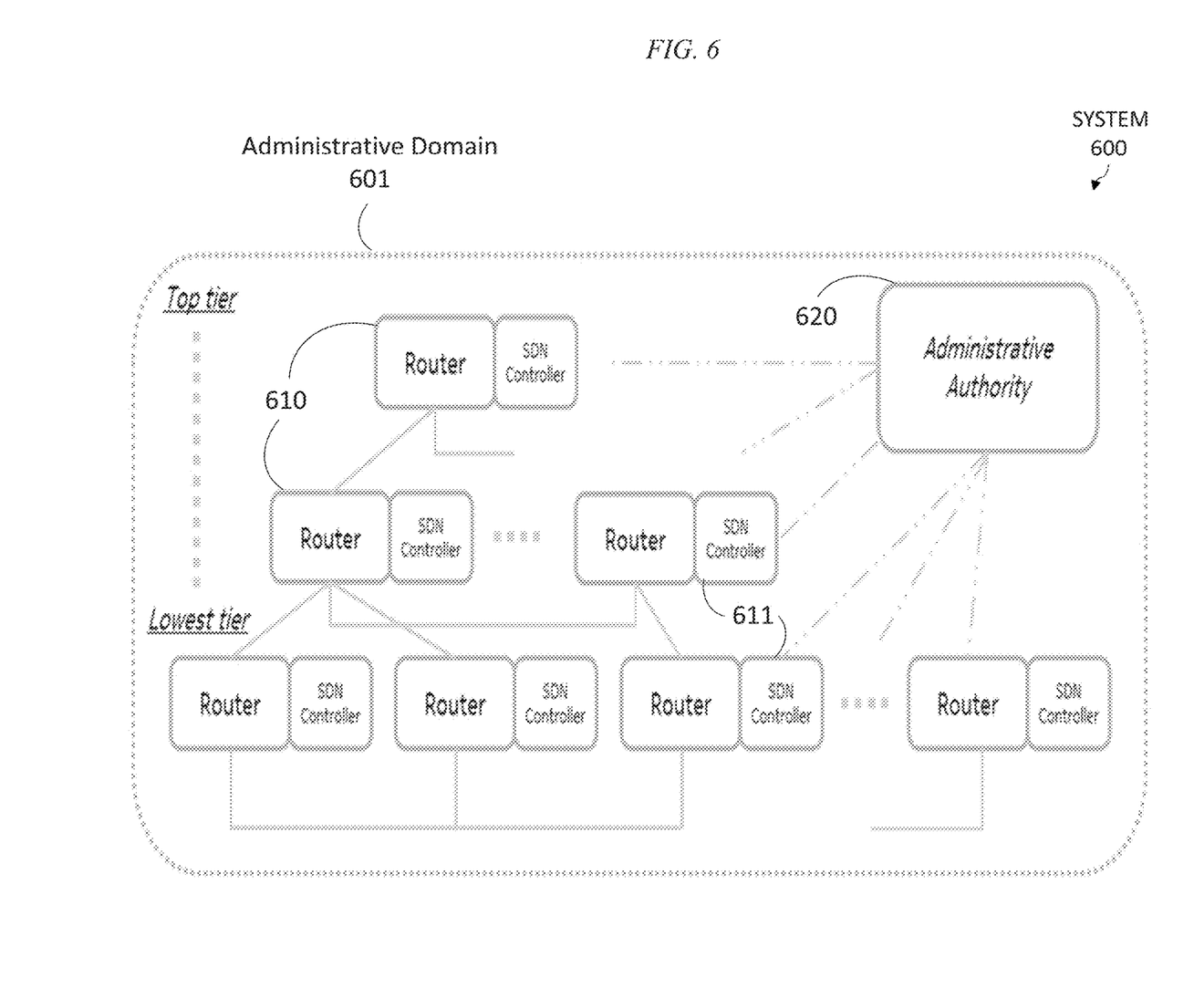
FIG. 6 depicts an example embodiment of a system configured to support flow reliability in deterministic networking.

FIG. 6 depicts an example embodiment of a system configured to support flow reliability in deterministic networking. The system 600 includes an administrative domain 601 including a set of routers 610 and an administrative authority 620. The administrative domain 601 may be defined at any suitable granularity, which may be based on various factors (e.g., a regional telco network, a datacenter, a university campus network, or the like). The administrative domain 601 may be arranged hierarchically in two or more tiers, with the administrative authority 620 (and possibly one or more routers 610) at the top tier and the routers 610 arranged in one or more lower tiers. The routers 610 include SDN capabilities represented as SDN controllers 611 associated with the routers 610, respectively. The routers 610 are configured to support flow reliability in deterministic networking. The routers 610 may interact with each other in the administrative domain, depending on roles, in order to support flow reliability in deterministic networking as presented herein. The administrative authority 620 is configured to control various aspects of the operation of the routers 610, such as supporting capabilities for configuring, monitoring, and managing the routers 610. It is noted that, while omitted for purposes of clarity, an application programming interface (API) may be available to non-router entities of the administrative domain 601 which are willing to use end-to-end deterministic transmission through the network (e.g., a personal computer or smartphone connected to the network, an edge computer or base station delivering information to one or more other network elements, or the like), thereby enabling end users and applications to dynamically leverage deterministic capabilities of network programmability as needed or desired. It will be appreciated that, while primarily presented with respect to example embodiments in which each router is equipped with an SDN controller, in at least some example embodiments only a portion of the SDN controllers (e.g., SDN controllers of routers 610 located in upper tiers of the hierarchy) may be used to support example embodiments for supporting flow reliability in deterministic networking, in at least some example embodiments only a portion of the routers 610 may include SDN controllers, or the like, as well as various combinations thereof. It will be appreciated that, although presented with respect to a particular arrangement of the routers 610, the routers 610 may be arranged in various other topologies (e.g., tree-like, leaf-spine, or using any other suitable topologies).

Various example embodiments for supporting flow reliability in deterministic networking may provide various advantages or potential advantages. For example, various example embodiments for supporting flow reliability in deterministic networking may be configured to support flow reliability in deterministic networking based on control over frame replication and elimination for deterministic flows in a manner for supporting deterministic resource recycling. For example, various example embodiments for supporting flow reliability in deterministic networking based on control over frame replication and elimination for deterministic flows may be configured to predict flow continuity for a deterministic flow for use in controlling replication and elimination of a redundant flow providing redundancy for the deterministic flow. For example, various example embodiments for supporting flow reliability in deterministic networking based on control over frame replication and elimination for deterministic flows may be configured to intelligently monitor usage of redundant flows and dynamically control use of redundant flows based on the intelligent monitoring of the redundant flows, thereby enabling conservation of resources (which may then be used for other purposes) such as bandwidth resources, processing resources, resources provided in deterministic protocol stacks for frame replication and elimination, or the like, as well as various combinations thereof. For example, various example embodiments for supporting flow reliability in deterministic networking may be configured to overcome over-provisioning of replicated network flows for time-sensitive networking. For example, various example embodiments for supporting flow reliability in deterministic networking may be configured to support flow reliability in deterministic networking that is based on fully centralized approaches, fully decentralized approaches, or, as primarily presented herein, for multi-tiered clustered networks configured to support scalability without performance loss. For example, various example embodiments for supporting flow reliability in deterministic networking may be configured to support flow reliability in deterministic networking while utilizing expensive deterministic resources more efficiently, at a manageable cost of employing cognitive flow optimizers at the nodes. For example, various example embodiments for supporting flow reliability in deterministic networking may be configured to support flow reliability in deterministic networking while maintaining compatibility with various types of deterministic flow protocol stacks (e.g., IEEE TSN protocol stacks, IETF DetNet protocol stacks, or the like). For example, various example embodiments for supporting flow reliability in deterministic networking may be configured to support flow reliability in deterministic networking while also supporting software defined networking (SDN) capabilities. For example, various example embodiments for supporting flow reliability in deterministic networking may be configured to support flow reliability in deterministic networking while remaining fully compliant with deterministic networking in large areas. For example, various example embodiments for supporting flow reliability in deterministic networking may be configured to support flow reliability in deterministic networking while supporting representation of a hierarchical clustered network topology compatible with latency-based zoning for frame replication and elimination in deterministic networking, capabilities for hierarchically allocating and deallocating deterministic resources, capabilities for minimizing utilization of deterministic resources used for replication, capabilities for maintaining reliability in deterministic transmission with less dedicated resources, capabilities for enabling deterministic networking in larger geographic areas, or the like, as well as various combinations thereof. For example, various example embodiments for supporting flow reliability in deterministic networking may be configured to support dynamic time-sensitive flows with dynamic replication using a low-complexity feedback mechanism and learning procedure that achieves better resource utilization while guaranteeing the same or similar reliability targets. For example, various example embodiments for supporting flow reliability in deterministic networking, by supporting flow reliability in deterministic networking that is based on use of dynamic time-sensitive flows with dynamic replication, may obviate the need for use of fixed time-sensitive flows with fixed replication (which generally results in overprovisioning with low resource utilization) or fixed time-sensitive flows with dynamic replication (which generally results in improved resource utilization at the expense of additional computational and communication complexity), although it will be appreciated that either or both such capabilities also may be applied in various contexts. For example, various example embodiments for supporting flow reliability in deterministic networking may be configured to reduce or even minimize the usage of dedicated resources provided in deterministic protocol stacks for frame replication and elimination in time-sensitive networking by intelligently monitoring usage of redundant flows and dynamically determining the need to pause the redundant flows for certain amounts of time, thereby enabling the associated dedicated resources (e.g., bandwidth or the like) to be used for other purposes. For example, various example embodiments for supporting flow reliability in deterministic networking may be configured to overcome over-provisioning of replicated network flows for time-sensitive networking by leveraging a deterministic hierarchical cooperation network; however, it will be appreciated that the various example embodiments presented herein for overcoming over-provisioning of replicated network flows for time-sensitive networking are not limited to use in such a deterministic hierarchical cooperation network and may be utilized in various network topologies that employ routers supporting time-sensitive networking capabilities. For example, various example embodiments for supporting flow reliability in deterministic networking may be configured to intelligently and dynamically determine usage of replication units for the deterministic flows, at the cost of additional complexity but without losing any performance and reliability guarantees, thereby improving or resolving the problem of over-provisioned redundant flows and, thus, resulting in more efficient utilization of the network. For example, various example embodiments for supporting flow reliability in deterministic networking may be configured to support deterministic networking based on use of distributed or semi-distributed controllers which may manage different portions of non-hierarchical networks (e.g., regions, metric-based zones, or the like) or hierarchical networks (e.g., different hierarchical levels within a hierarchy and the various nodes which fall into clusters at different hierarchical levels). Various example embodiments for supporting flow reliability in deterministic networking may provide various other advantages or potential advantages.

Figure 7:
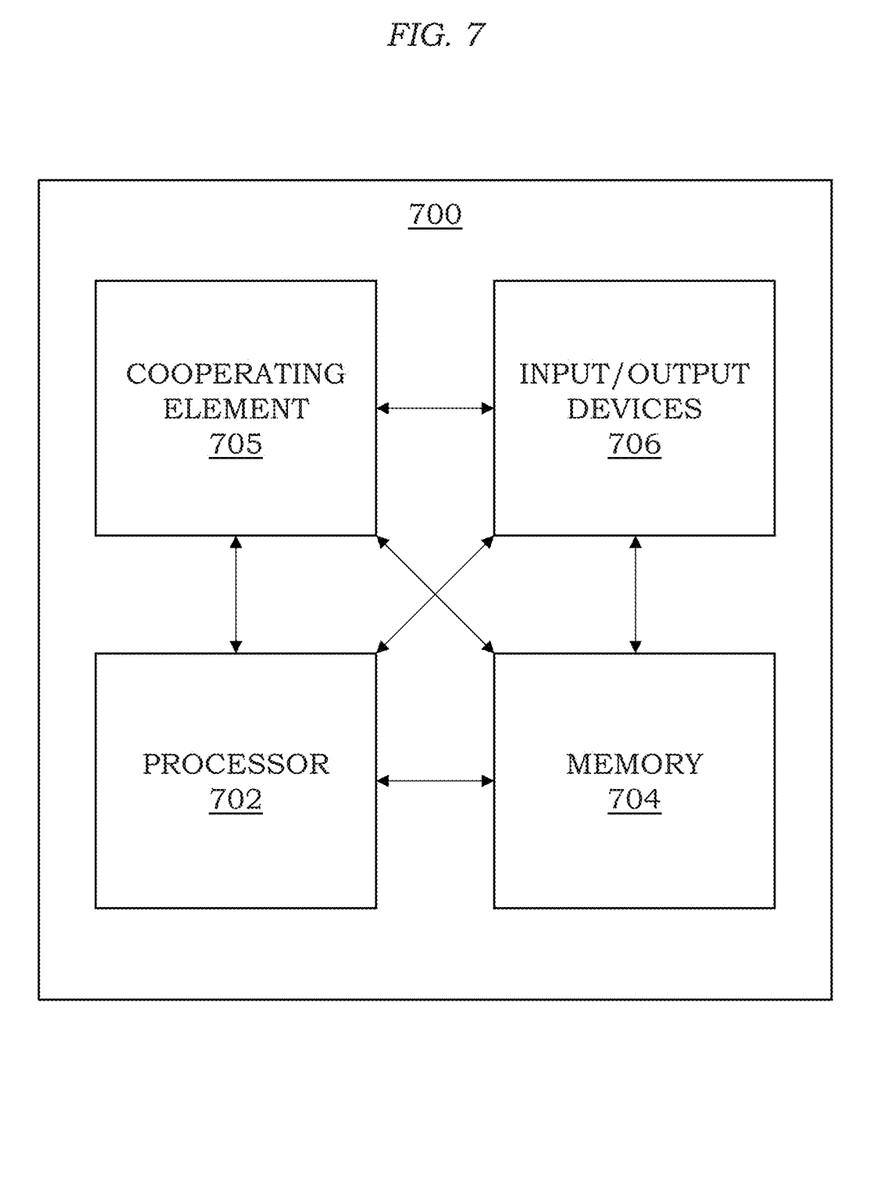
FIG. 7 depicts an example embodiment of a computer suitable for use in performing various functions presented herein.

FIG. 7 depicts an example embodiment of a computer suitable for use in performing various functions presented herein.

The computer 700 includes a processor 702 (e.g., a central processing unit (CPU), a processor, a processor having a set of processor cores, a processor core of a processor, or the like) and a memory 704 (e.g., a random access memory, a read only memory, or the like). The processor 702 and the memory 704 may be communicatively connected. In at least some example embodiments, the computer 700 may include at least one processor and at least one memory including a set of instructions, wherein the set of instructions is configured to, when executed by the at least one processor, cause the computer to perform various functions presented herein.

The computer 700 also may include a cooperating element 705. The cooperating element 705 may be a hardware device. The cooperating element 705 may be a process that can be loaded into the memory 704 and executed by the processor 702 to implement various functions presented herein (in which case, for example, the cooperating element 705 (including associated data structures) can be stored on a non-transitory computer-readable storage medium, such as a storage device or other suitable type of storage element (e.g., a magnetic drive, an optical drive, or the like)).

The computer 700 also may include one or more input/output devices 706. The input/output devices 706 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof. It will be appreciated that computer 700 may represent a general architecture and functionality suitable for implementing functional elements described herein, portions of functional elements described herein, or the like, as well as various combinations thereof. For example, computer 700 may provide a general architecture and functionality that is suitable for implementing one or more elements presented herein, such as a network devices (e.g., routers, switches, or the like), network controllers, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory including computer program code;
wherein the at least one memory and the computer program code are configured to, with the at least one processor, cause the apparatus to:
receive, by a node configured to operate as a replicating node for a redundant flow associated with a deterministic flow based on replication of packets of the deterministic flow to form the redundant flow and from a node configured to operate as an eliminating node for the redundant flow, a message configured to request that the redundant flow be placed in a hold state; and
place, by the node configured to operate as the replicating node for the redundant flow based on the message, the redundant flow in the hold state, including sending, to a time sensitive networking protocol stack on the node configured to operate as the replicating node for the redundant flow, a request to place the redundant flow in the hold state.

2. The apparatus of claim 1, wherein the message is configured to request that the redundant flow be placed in the hold state for a length of time.

3. The apparatus of claim 2, wherein the length of time is a length of time for which a flow continuity of the deterministic flow is predicted to satisfy a condition.

4. The apparatus of claim 1, wherein the at least one memory and the computer program code are configured to, with the at least one processor, cause the apparatus to:

remove, by the node configured to operate as the replicating node for the redundant flow based on a determination that a message is not received from the node configured to operate as the eliminating node for the redundant flow for a threshold length of time, the redundant flow from the hold state.

5. The apparatus of claim 1, wherein the at least one memory and the computer program code are configured to, with the at least one processor, cause the apparatus to:

remove, by the node configured to operate as the replicating node for the redundant flow based on an indication of a condition associated with the deterministic flow, the redundant flow from the hold state.

6. The apparatus of claim 5, wherein the condition associated with the deterministic flow is a degradation associated with the deterministic flow, an error associated with the deterministic flow, or a failure associated with the deterministic flow.

7. The apparatus of claim 1, wherein the at least one memory and the computer program code are configured to, with the at least one processor, cause the apparatus to:

initiate, by the node configured to operate as the replicating node for the redundant flow, use of at least a portion of the resources of the redundant flow for a different flow.

8. The apparatus of claim 7, wherein the different flow supports a different type of traffic than the deterministic flow.

9. A method, comprising:

receiving, by a node configured to operate as a replicating node for a redundant flow associated with a deterministic flow based on replication of packets of the deterministic flow to form the redundant flow and from a node configured to operate as an eliminating node for the redundant flow, a message configured to request that the redundant flow be placed in a hold state; and placing, by the node configured to operate as the replicating node for the redundant flow based on the message, the redundant flow in the hold state, including sending, to a time sensitive networking protocol stack on the node configured to operate as the replicating node for the redundant flow, a request to place the redundant flow in the hold state.

10. The method of claim 9, wherein the message is configured to request that the redundant flow be placed in the hold state for a length of time.

11. The method of claim 10, wherein the length of time is a length of time for which a flow continuity of the deterministic flow is predicted to satisfy a condition.

12. The method of claim 9, further comprising:

removing, by the node configured to operate as the replicating node for the redundant flow based on a determination that a message is not received from the node configured to operate as the eliminating node for the redundant flow for a threshold length of time, the redundant flow from the hold state.

13. The method of claim 9, further comprising:

removing, by the node configured to operate as the replicating node for the redundant flow based on an indication of a condition associated with the deterministic flow, the redundant flow from the hold state.

14. The method of claim 13, wherein the condition associated with the deterministic flow is a degradation associated with the deterministic flow, an error associated with the deterministic flow, or a failure associated with the deterministic flow.

15. The method of claim 9, further comprising:

initiating, by the node configured to operate as the replicating node for the redundant flow, use of at least a portion of the resources of the redundant flow for a different flow.

16. The method of claim 15, wherein the different flow supports a different type of traffic than the deterministic flow.

* * * * *